(12) United States Patent
Seng

(10) Patent No.: US 10,160,252 B2
(45) Date of Patent: Dec. 25, 2018

(54) HOLE-LESS EDITABLE BINDING SYSTEM

(71) Applicant: Michael A. Seng, Portland, OR (US)

(72) Inventor: Michael A. Seng, Portland, OR (US)

(73) Assignee: Michael A. Seng, Portland, OR (US)

( * ) Notice: Subject to any disclaimer, the term of this patent is extended or adjusted under 35 U.S.C. 154(b) by 234 days.

(21) Appl. No.: 15/136,051

(22) Filed: Apr. 22, 2016

(65) Prior Publication Data

US 2016/0236504 A1   Aug. 18, 2016

Related U.S. Application Data

(63) Continuation of application No. 14/183,330, filed on Feb. 18, 2014, now Pat. No. 9,358,826.

(60) Provisional application No. 61/767,116, filed on Feb. 20, 2013.

(51) Int. Cl.
*B42F 1/00* (2006.01)
*F16B 2/06* (2006.01)

(52) U.S. Cl.
CPC ................ *B42F 1/00* (2013.01); *F16B 2/065* (2013.01); *Y10T 24/20* (2015.01)

(58) Field of Classification Search
CPC .... B42F 13/14; B42F 1/00; B42F 1/03; B42F 9/00; B42F 9/007; Y10T 24/20; Y10T 24/201
See application file for complete search history.

(56) References Cited

U.S. PATENT DOCUMENTS

| | | | |
|---|---|---|---|
| 395,771 A | | 1/1889 | Crane |
| 418,815 A | | 1/1890 | Ogden |
| 445,031 A | * | 1/1891 | Barlow et al. |
| 729,763 A | | 6/1903 | Hartmann |
| 807,557 A | * | 1/1904 | Hulquist |
| 857,100 A | | 1/1906 | Norman |
| 971,294 A | | 9/1910 | McBee |
| 1,430,366 A | | 9/1922 | Fleck |
| 1,658,749 A | * | 9/1925 | Walker |
| 1,611,676 A | | 12/1926 | Prickitt |
| 1,753,366 A | | 4/1930 | Lisle |

(Continued)

OTHER PUBLICATIONS

Non-Final Office Action dated Aug. 28, 2015, on U.S. Appl. No. 14/183,330.

(Continued)

*Primary Examiner* — Joshua T Kennedy

(57) ABSTRACT

A system for externally binding flat media by hand for presentation purposes without a need for creating a spine, hole-punching paper, permanent covers or insertion into pre-constructed sleeves. It employs a slim, external bar, placed in the margin area on the front side of a flat media stack and a rigid backing board on the rear side. The entire assembly is held together firmly by threaded bolts and adjoining screw posts that are adjusted depending upon the quantity of sheets included and their thicknesses. The stack is compressed and decompressed by tightening or loosening the threaded bolts whenever sheets are added or removed. The low-profile system firmly grips sheets with unlikely slippage, requires no heat or adhesives, and provides the ease of turning the pages or sheets as typical in a perfect-bound book. It accommodates common lengths of paper stock and fabric swatches, and multiple thicknesses within the same stack.

19 Claims, 7 Drawing Sheets

(56) References Cited

U.S. PATENT DOCUMENTS

| | | |
|---|---|---|
| 1,828,600 A | 10/1931 | Finley |
| 2,120,086 A | 6/1938 | Brown |
| 4,991,990 A | 2/1991 | Frank |
| 5,690,443 A | 11/1997 | Sullivan |
| 7,120,968 B2 | 10/2006 | Huene et al. |
| 2010/0209176 A1 | 8/2010 | Okamaura |

OTHER PUBLICATIONS

Final Office Action dated Nov. 23, 2015, on U.S. Appl. No. 14/183,330.

Notice of Allowance dated Feb. 22, 2016, on U.S. Appl. No. 14/183,330.

Brad Isaac, "Fun and Easy How to Guide to Binding Your Own Paperback Book at Home . . . Fast" http://www.persistenceunlimited.com/2006/03/fun-and-easy-how-to-guide-to-binding-your-own-paperback-books-at-homefast//2006/03/20.

\* cited by examiner

HOLE-LESS EDITABLE BINDING SYSTEM

RELATED APPLICATIONS

This application is a continuation application of U.S. patent application Ser. No. 14/183,330 filed on Feb. 18, 2014, which claims the benefit of Provisional Application No. 61/767,166 filed on Feb. 20, 2013, the entire contents of both are hereby incorporated by reference.

BACKGROUND

This utility invention relates to a method of easily and tightly binding stacks of loose-leaf paper or other flat media for editable presentation purposes by hand. Particularly, this invention eliminates the need to punch holes in paper, include a spine or use sleeve inserts. It secures the paper or fabric stack neatly in place while transporting or displaying documents, fabric or artwork. It allows for customized covers and back covers or backing boards. The assembly can also be used as an easel.

BRIEF DESCRIPTION OF PRIOR ART

In prior patents of editable presentation book binding systems, channels often are made through the printed media, typically for insertion of bolts and binder rings, hence the task of manual hole-punching or using a hole-punching device is necessary. Such systems add extra steps and financial costs in creating a book or portfolio. A ring binder must always be opened each time an insert is added or deleted creating the chance for human error, damage to the paper as well as bodily injury. Hole-punched adhesive strips are available to attach to loose-leaf paper though these are costly, time consuming and must be discarded whenever the attached sheet is discarded. Other times, there are metal spring-tension clamps or clips that hold the paper stack from the sides or tops of the pages. These devices are often less streamlined as needed for artistic portfolios, consume needed space and provide inadequate pressure allowing the inserts to shift in transport or when being handled. They are sometimes complex mechanisms that are distracting from the artwork and other documents, do not adequately hold material in place or snag other materials. There is also a ratchet binding system that applies pressure though isn't streamlined and is as permanent as traditional bookbinding. It is also not editable. Many flimsy binding methods exist that are unsuitable for larger documents, heavy weight paper stock, fabrics, leather or larger paper stacks. Often, various binding devices are internal and/or do not allow for custom covers or backing support boards.

BRIEF SUMMARY OF INVENTION

This invention is a system for externally binding a stack of loose-leaf paper, fabric or other flat media for presentation purposes, without the need for creating a spine, holepunching paper, permanent covers or insertion into pre-constructed sleeves. It employs the use of a slim, external bar constructed of dense material and is placed in the margin area on the front side of a paper stack and a rigid backing board on the rear side. The entire assembly is held together firmly with threaded bolts and adjoining screw posts that can be adjusted depending upon how many paper sheets are included and their thicknesses. The paper stack is compressed and decompressed by tightening or loosening the threaded bolts whenever pages are added or removed. Multiple length threaded bolts and screw posts can be interchanged as needed to allow for varying thicknesses of paper stacks, backing boards, backing board designs and various types and thicknesses of cosmetic/decorative covers. Various backing board thickness may also be employed to add or delete necessary spacing.

The system firmly grips paper or fabric with unlikely slippage, requires no heat or adhesives, and provides the ease of turning the pages or sheets as typical in a perfect bound book. It accommodates common lengths of paper stock and fabric swatches, and multiple thicknesses within the same stack.

REFERENCE NUMERALS IN THE DRAWINGS

Figure 1:
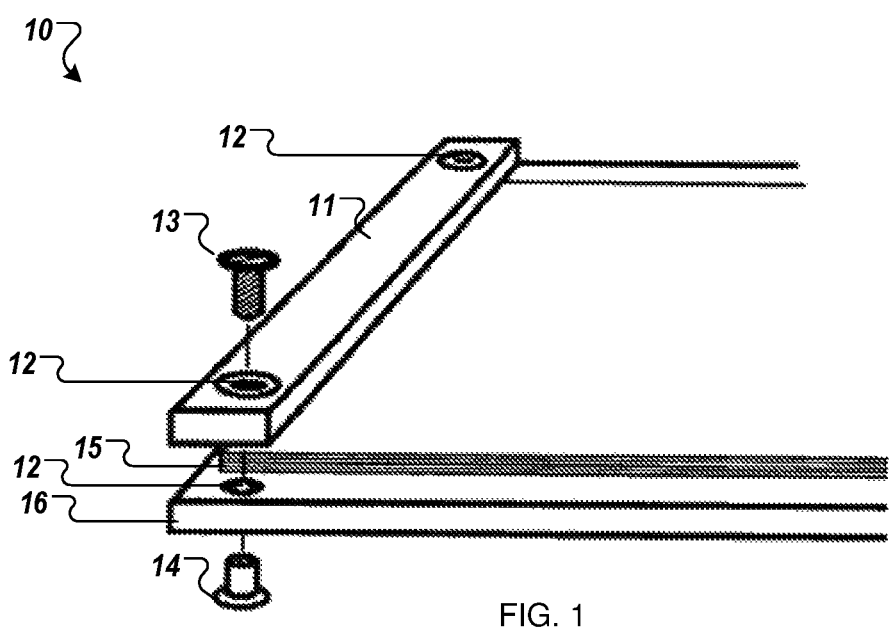
FIG. 1 shows an overhead perspective view of the entire binding system including the dense bar, top threaded bolt and lower screw post protruding from the bottom through the backing board. A paper or fabric stack is about to be sandwiched between the bar and backing board assembly.
Figure 2:
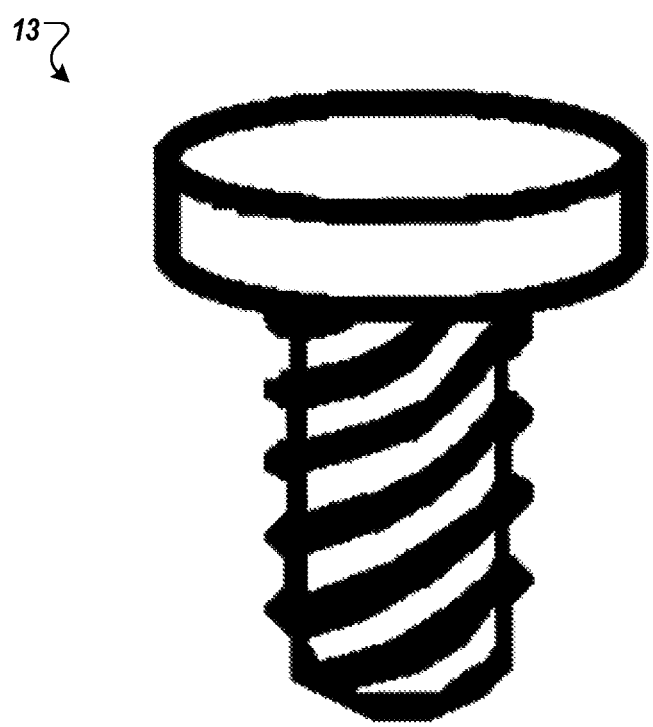
FIG. 2 shows an exploded perspective view of a threaded bolt that can be used in the through-holes of the bar from the top down into the screw post on the bottom.
Figure 3:
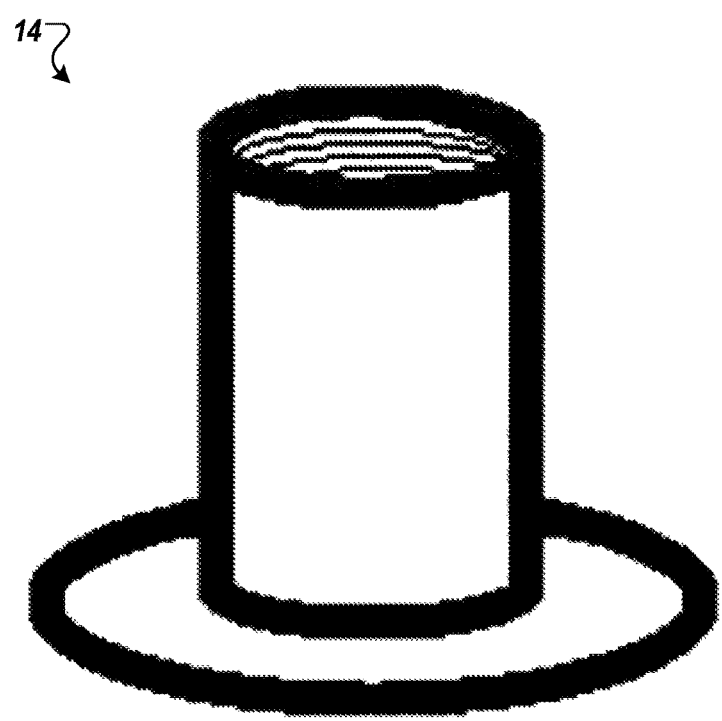
FIG. 3 shows an exploded perspective view of a screw post that can be used in the through-holes from the bottom of the backing board and connects to the top threaded bolt through the bar that resides above it.
Figure 4:
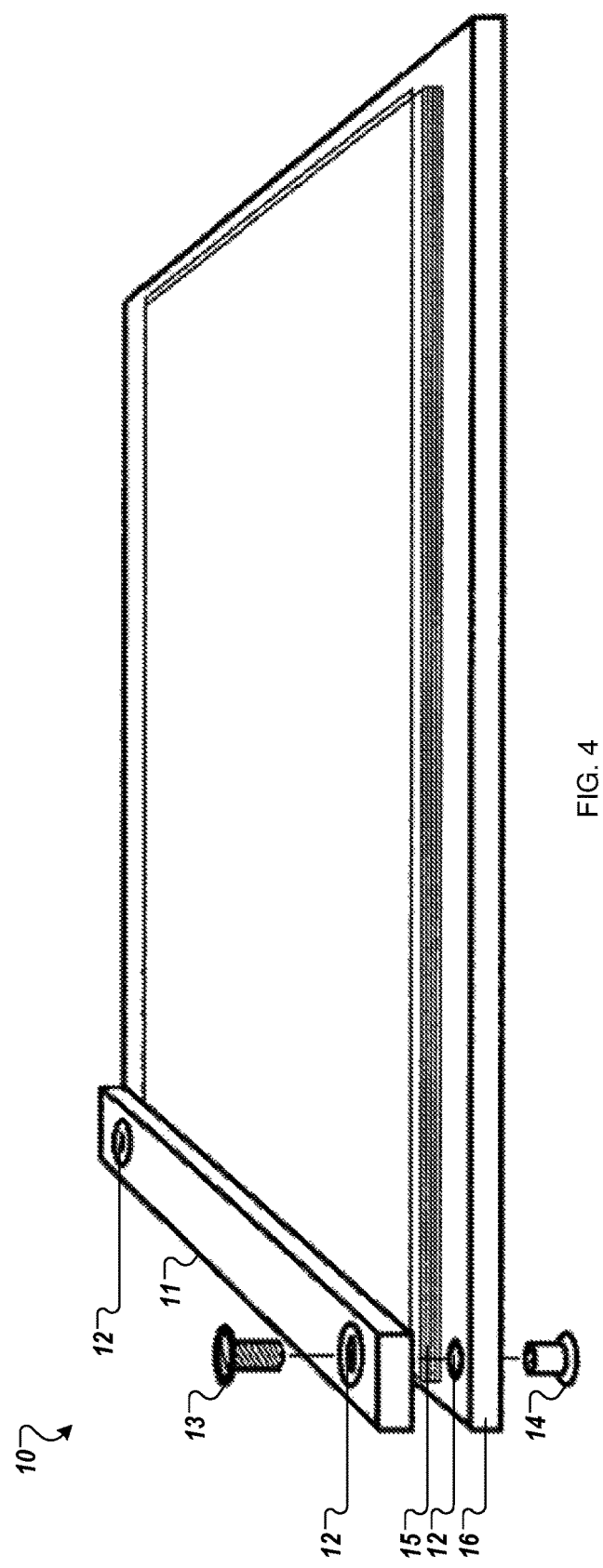
FIG. 4 shows the front perspective view of the open device. The screw post is inserted through a hole in the backing board and will securely hold the binding system once the top threaded bolt is inserted as deeply as needed.
Figure 5:
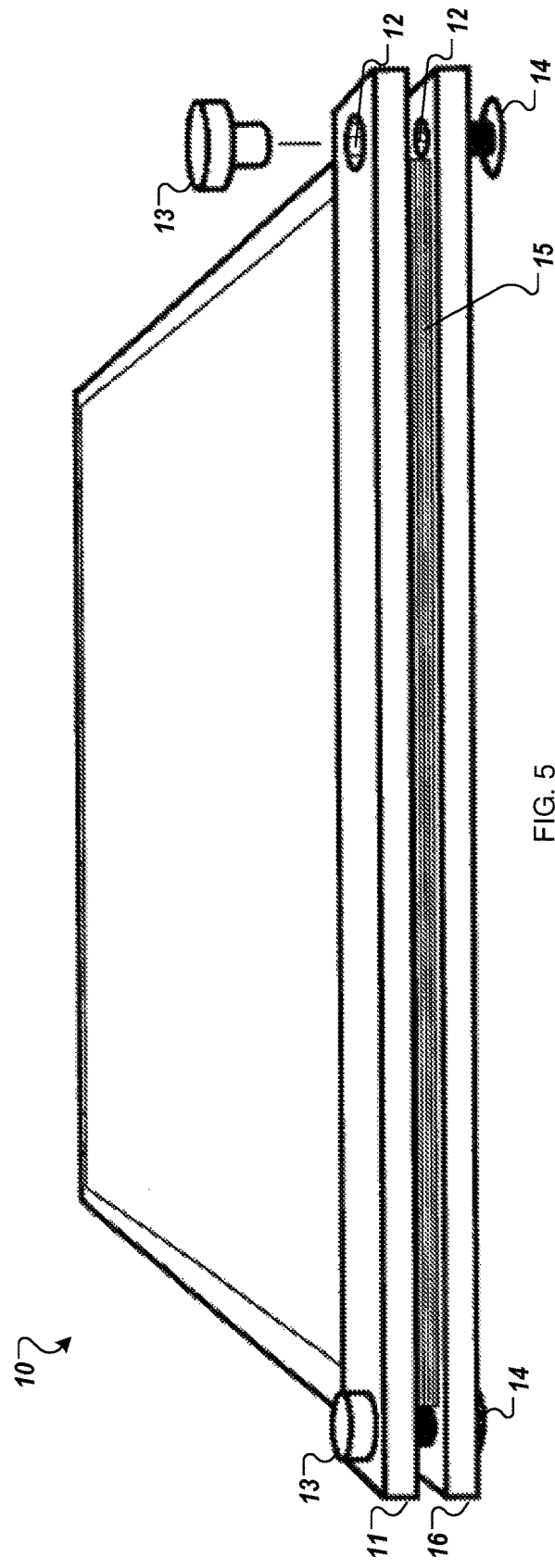
FIG. 5 shows a side perspective view of a paper or fabric stack tightly secured between the bar and the backing board by means of the threaded bolts and screw posts on either end. This board can be made of nearly any dense material that can have a hole bored through it.

10—Hole-less editable binding system
11—Dense bar
12—Channel through hole entry points
13—Threaded male bolt or screw
14—Threaded female screw post or socket
15—Flat material such as paper, fabric or leather
16—Dense backing board
17—Screw post barrel extender
18—Cover
19—Hinge

DETAILED DESCRIPTION

A channel hole 12 is made at the top of both a dense bar 11 constructed from a high-density material such as metal, wood, bone or polymer. The bar 11 is placed along a paper or fabric stack 15 margin and again at the corresponding area of a dense material backing board 16. Another channel hole 12 is made at the bottom (opposite end) of both the same bar 11 and backing board 16.

Threaded bolts 13 and screw posts 14 are inserted through the channels 12. The screw post assembly is hand-fastened as far down/in as necessary while allowing generous room for the paper or fabric stack 15 that is to be inserted. The edge of the paper or fabric stack 15 is then inserted under the long end of the bar 11 through the gap between the two screw posts 14 where they will be held neatly and securely. The stack 15 is aligned flush against the long edge of the bar 11 and a dense backing board 16. Finer adjustments of the screw post 14 heads are made to bear down tightly on the paper or fabric stack 15. The placement of the screw heads on either end of the bar 11 ensures an even and consistent inward pressure on the stack 15.

The slim bar 11 is extremely durable and allows for maximum live area for printed media and other presentation material. Inserted material 15 is instantly secured once they are bound beneath the bar 11, enabling immediate and easy page turning with this hole-less editable binding system 10. There is also less tearing as seen with ring-bound systems because of its perfect-bound attribute. Depending upon the thickness of the cover, fabric and/or paper stock, pages will lie open without flipping back unlike many other binder systems. The system's simple unobtrusive design is less distracting from aesthetic components of a portfolio including its contents. Its structure also aids in weighing down the paper stack 15, so it is stable on a table or desk as pages are turned and also wind resistant. It can also anchor a hinge 19, if a protective or decorative hard cover 18 addition is desired.

Unlike a bookbinding jig, no screw or bolt nuts protrude, so its low-profile design won't harm users or table surfaces under normal use. It easily fits into cases, bags or larger portfolios. Various thickness of backing boards 16 can be interchanged to allow for various cosmetic design options and/or for purposes of adding or reducing space in order to accommodate more or less paper or other flat media 15. Books created with this system can be easily shelved or stacked for shipping, filing or archival purposes. It allows for any inserts 15 that can be placed between the bar 11 including fabrics or other flat media that may include thicker materials attached to the inserted sheets such as computer disks, novelty items, product samples, booklets, etc.

The system does not require the use of any adhesives and can be made entirely of recycled materials.

Variations

Dense metal, polymer, bone and wood materials can be employed for the dense bar 11.

A corresponding dense bar to bar 11 on the rear side of the paper or fabric stack 15 may be used in place of the backing board 16 for a tighter binding.

Bolt 13 and screw post 14 may be reversed and provide the same utility or function.

Rigid covers 18 with a hinge 19 can be connected to the bar 11 to protect the front of inserted materials 15.

Varying threaded bolt 13 and screw post 14 lengths to accommodate for more or less papers in the stack 15.

Figure 6:
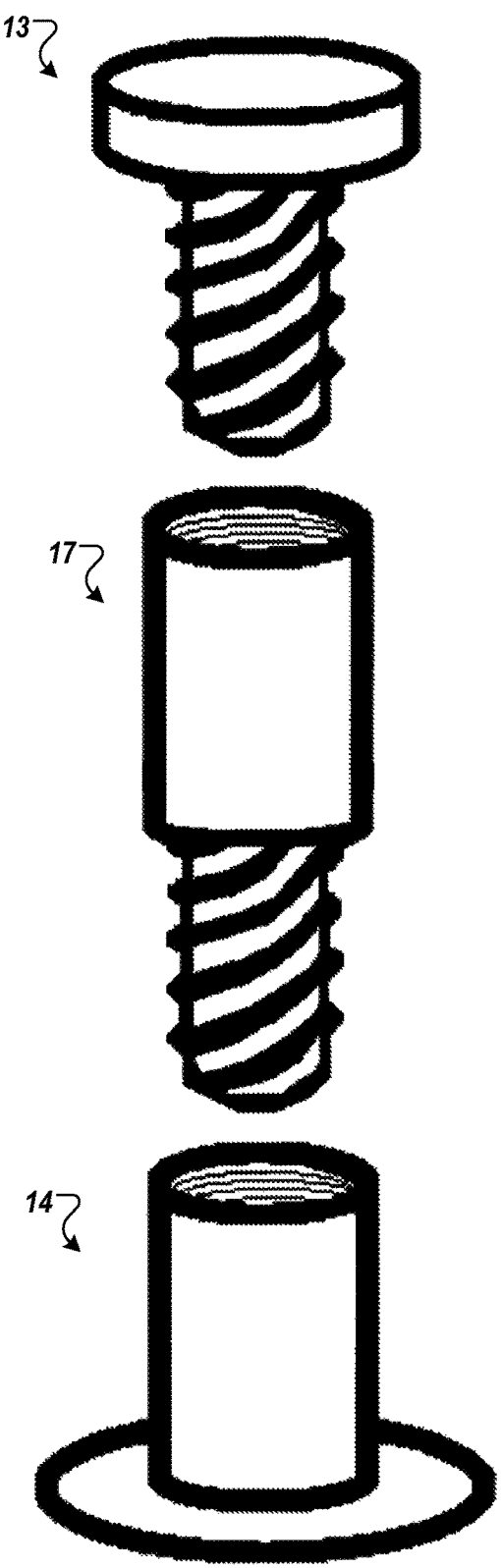
FIG. 6 shows an exploded perspective view of a threaded bolt 13, a screw post barrel extender 17, and a screw post 14.
Figure 7:
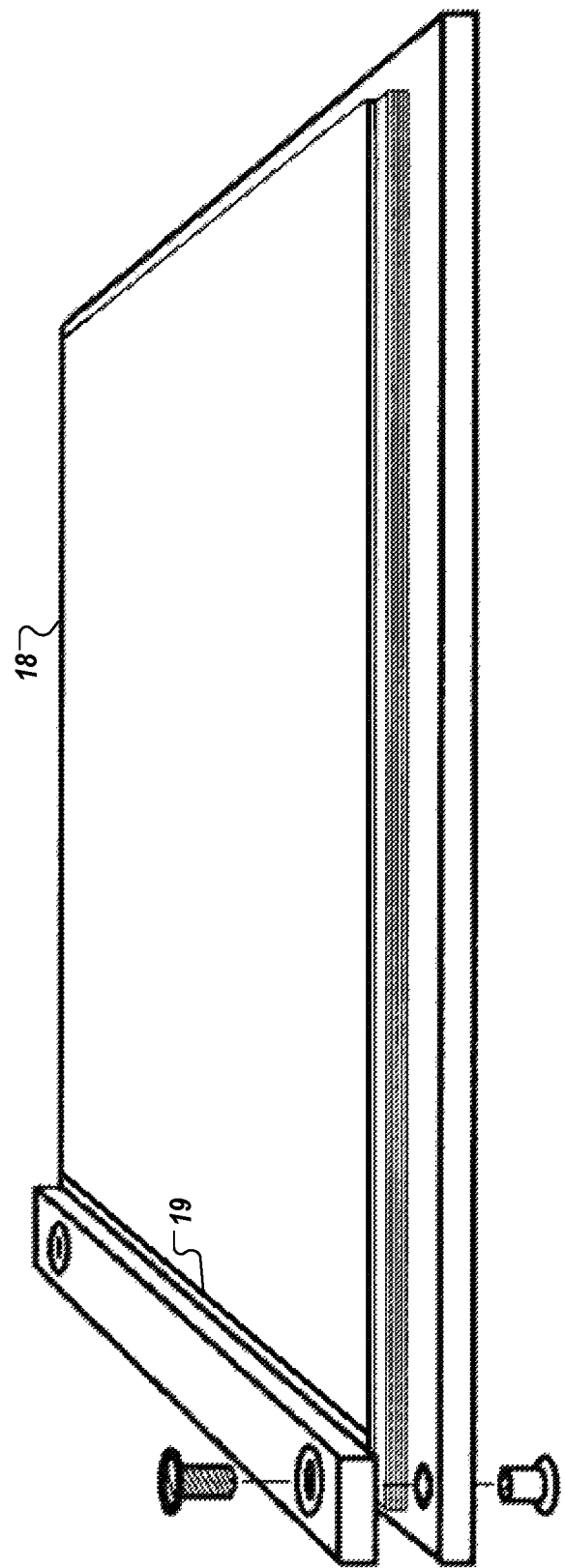
FIG. 7 shows the front perspective view of the open device with a cover and hinge.

As shown in FIG. 6, screw post barrel extenders 17 may be used between threaded bolt 13 and screw post 14 for extra thick stacks of materials.

Additional fasteners that enter the through-holes at either end of the dense bar to create an inward pressure on the inserted material.

What is claimed is:

1. A hole-less portfolio binding system comprising:
   a single external bar comprising:
      a lateral bar surface that forms a perimeter of the single external bar;
      an upper bar surface comprising a first end and a second end; and
      a lower bar surface, wherein a first bar channel hole extends perpendicularly from the first end to the lower bar surface within the perimeter of the single external bar, wherein a second bar channel hole extends perpendicularly from the second end to the lower bar surface within the perimeter of the single external bar, and wherein the upper bar surface is fixed relative to the lower bar surface;
   a rigid rectangular backing board comprising:
      an upper board surface comprising a first corner and a second corner, wherein the upper board surface is larger than the lower bar surface;
      a lower board surface, wherein a first backing-board through-hole extends perpendicularly from the first corner to the lower board surface and a second backing-board through-hole extends perpendicularly from the second corner to the lower board surface, wherein each of the first backing-board through hole and the second backing-board through-hole has a board through-hole diameter;
   a first top-threaded bolt inserted through the first bar channel hole;
   a second top-threaded bolt inserted through the second bar channel hole, wherein each of the first bar channel hole and the second bar channel hole has a hole diameter that is equal to the board through-hole diameter, wherein each of the first top-threaded bolt and the second top-threaded bolt has a bolt head diameter that is larger than the hole diameter, wherein each of the first backing-board through hole and the first bar channel hole has a corresponding first counter bore, wherein each of the second backing-board through hole and the second bar channel hole has a corresponding second counter bore;
   a first screw post inserted through the first backing-board through-hole, wherein the first screw post engages with the first top-threaded bolt to draw the first end toward the first corner, wherein the first screw post and the first top-threaded bolt are configured to be reversibly seated in corresponding first counter bores, wherein a first central axis of the first top-threaded bolt and a second central axis of a first post head of the first screw post are axially aligned; and
   a second screw post inserted through the second backing-board through-hole, wherein the second screw post engages with the second top-threaded bolt to draw the second end toward the second corner, wherein the second screw post and the second top-threaded bolt are configured to be reversibly seated in corresponding second counter bores, wherein a third central axis of the second top-threaded bolt and a fourth central axis of a second post head of the second screw post are axially aligned.

2. The hole-less portfolio binding system of claim 1, wherein
   each of the first screw post and the second screw post has a screw head diameter that is larger than the board through-hole diameter.

3. The hole-less portfolio binding system of claim 1, wherein
   the external bar is narrow and dense,
   the lower bar surface has a bar length similar to a board length of the upper board surface, and
   the upper board surface has a board width substantially larger than a bar width of the lower bar surface.

4. The hole-less portfolio binding system of claim 1, wherein a surface area of the upper board surface that is available for receiving media has a width that is less than a distance between the first and second bar channel holes and is located between the first top-threaded bolt and the second top-threaded bolt.

5. The hole-less portfolio binding system of claim 1, wherein
the first top-threaded bolt has a low profile first head,
the second top-threaded bolt has a low profile second head,
the first screw post has a low profile first flange,
the second screw post has a low profile second flange, and
the low profile first head and the low profile second head directly engage the upper bar surface and the low profile first flange and the low profile second flange directly engage the lower board surface for gripping media between the lower bar surface and the upper board surface.

6. The hole-less portfolio binding system of claim 5, wherein
the low profile first head does not substantially protrude from the upper bar surface when the first top-threaded bolt is engaged with the first screw post,
the low profile second head does not substantially protrude from the upper bar surface when the second top-threaded bolt is engaged with the second screw post,
the low profile first flange does not substantially protrude from the lower board surface when the first screw post is engaged with the first top-threaded bolt, and
the low profile second flange does not substantially protrude from the lower board surface when the second screw post is engaged with the second top-threaded bolt.

7. The hole-less portfolio binding system of claim 1, wherein a screw post barrel extender is engaged between the first top-threaded bolt and the first screw post.

8. The hole-less portfolio binding system of claim 1, wherein a hinge of a protective or decorative hard cover addition is removably connected or anchored to the external bar.

9. The hole-less portfolio binding system of claim 1, wherein the upper bar surface and the lower bar surface are flat and parallel.

10. The hole-less portfolio binding system of claim 1, wherein
the first top-threaded bolt comprises a first bolt head that is uncovered,
the first post head is uncovered,
the second top-threaded bolt comprises a second bolt head that is uncovered, and
the second post head is uncovered.

11. The hole-less portfolio binding system of claim 1, wherein
the first top-threaded bolt is removably inserted through the first bar channel hole;
the second top-threaded bolt is removably inserted through the second bar channel hole;
the first screw post is removably inserted through the first backing-board through-hole; and
the second screw post is removably inserted through the second backing-board.

12. A system comprising:
a bar comprising a first dense material, the bar comprising:
an upper bar surface; and
a lower bar surface, wherein a first bar through-hole extends from the upper bar surface to the lower bar surface and a second bar through-hole extends from the upper bar surface to the lower bar surface;
a board comprising a second dense material, the board comprising:
a lower board surface; and
an upper board surface, wherein a first board through-hole extends from the lower board surface to the upper board surface and a second board through-hole extends from the lower board surface to the upper board surface;
a first bolt comprising a first bolt male threaded portion and a first bolt head upper surface, wherein the first bolt head upper surface is to be substantially coplanar with the upper bar surface;
a second bolt comprising a second bolt male threaded portion and a second bolt head upper surface, wherein the second bolt head upper surface is to be substantially coplanar with the upper bar surface;
a first post comprising a first post head upper surface to be substantially coplanar with the lower board surface and a first post female threaded portion to engage with the first bolt male threaded portion, wherein a first central axis of the first bolt and a second central axis of a first post head of the first post are axially aligned; and
a second post comprising a second post head upper surface to be substantially coplanar with the lower board surface and a second post female threaded portion to engage with the second bolt male threaded portion, wherein the first post to engage with the first bolt and the second post to engage with the second bolt, wherein a third central axis of the second bolt and a fourth central axis of a second post head of the second post are axially aligned, wherein the first bar through-hole and the second bar through-hole each have a bar through-hole diameter, wherein the first board through hole and second board through-hole each have a board through-hole diameter that is equal to the bar through-hole diameter, wherein the first post and the first bolt are configured to be reversibly seated, wherein the second post and the second bolt are configured to be reversibly seated.

13. The system of claim 12, wherein:
a first fastening assembly comprises the first bolt and the first post;
a second fastening assembly comprises the second bolt and the second post; and
the first fastening assembly is hand-fastened and the second fastening assembly is hand-fastened for securing media between the upper board surface and the lower bar surface.

14. The system of claim 12, wherein:
the upper bar surface comprises a first bar indentation and a second bar indentation;
the first bar through-hole extends from the first bar indentation to the lower bar surface and the second bar through-hole extends from the second bar indentation to the lower bar surface;
the first bolt further comprises a first bolt head lower surface, wherein the first bolt head upper surface is to be coplanar with the upper bar surface and the first bolt head lower surface is to be disposed in the first bar indentation; and
the second bolt further comprises a second bolt head lower surface, wherein the second bolt head upper surface is to be coplanar with the upper bar surface and the second bolt head lower surface is to be disposed in the second bar indentation.

15. The system of claim 12, wherein the first dense material has a different density than the second dense material.

16. The system of claim 12, wherein the first dense material has a higher density than the second dense material.

17. The system of claim 12, wherein
the bar comprises a first bar peripheral surface, a second bar peripheral surface, a third bar peripheral surface, and a fourth bar peripheral surface,
the board comprises a first board peripheral surface, a second board peripheral surface, a third board peripheral surface, and a fourth board peripheral surface,
the first bar peripheral surface is substantially coplanar with the first board peripheral surface,
the second bar peripheral surface is substantially coplanar with the second board peripheral surface,
the third bar peripheral surface is substantially coplanar with the third board peripheral surface, and
the fourth bar peripheral surface is not coplanar with the fourth board peripheral surface.

18. A method comprising:
placing a lower bar surface of a bar along a margin of an upper surface of media, wherein the bar comprises a first bar through-hole extending from an upper bar surface of the bar to the lower bar surface and a second bar through-hole extending from the upper bar surface to the lower bar surface;
placing a lower surface of the media on an upper board surface of a board, wherein a first board through-hole extends from the upper board surface to a lower board surface of the board and a second board through-hole extends from the upper board surface to the lower board surface;
aligning the first bar through-hole with the first board through-hole and the second bar through-hole with the second board through-hole;
inserting a first bolt in the bar, wherein the first bolt comprises a first bolt male threaded portion and a first bolt head upper surface to be substantially coplanar with the upper bar surface;
inserting a second bolt in the bar, wherein the second bolt comprises a second bolt male threaded portion and a second bolt head upper surface to be substantially coplanar with the upper bar surface;
inserting a first post in the board, wherein the first post comprises a first post female threaded portion and a first post head upper surface, the first post head upper surface to be substantially coplanar with the lower board surface;
inserting a second post in the board, wherein the second post comprises a second post female threaded portion and a second post head upper surface, the second post head upper surface is to be substantially coplanar with the lower board surface; and
engaging the first post female threaded portion with the first bolt male threaded portion and the second post female threaded portion with the second bolt male threaded portion to secure the media between the upper board surface and the lower bar surface, wherein a first central axis of the first bolt and a second central axis of a first post head of the first post are axially aligned, wherein a third central axis of the second bolt and a fourth central axis of a second post head of the second post are axially aligned, wherein the first bar through-hole and the second bar through-hole each have a bar through-hole diameter, wherein the first board through hole and second board through-hole each have a board through-hole diameter that is equal to the bar through-hole diameter, wherein the first post and the first bolt are configured to be reversibly seated, wherein the second post and the second bolt are configured to be reversibly seated.

19. The method of claim 18, wherein:
a first fastening assembly comprises the first bolt and the first post;
a second fastening assembly comprises the second bolt and the second post; and
the engaging comprises hand-fastening the first fastening assembly and hand-fastening the second fastening assembly.

* * * * *